United States Patent [19]
Jones

[11] Patent Number: 5,146,670
[45] Date of Patent: Sep. 15, 1992

[54] PROFILING AND DEBURRING OF WORKPIECES

[75] Inventor: Everett E. Jones, Wichita, Kans.

[73] Assignee: The Boeing Company, Seattle, Wash.

[21] Appl. No.: 543,406

[22] Filed: Jun. 26, 1990

Related U.S. Application Data

[63] Continuation-in-part of Ser. No. 226,552, Jul. 29, 1988, Pat. No. 4,998,206, which is a continuation-in-part of Ser. No. 107,477, Oct. 13, 1987, abandoned, which is a continuation of Ser. No. 942,261, Dec. 16, 1986, Pat. No. 4,700,308, which is a continuation of Ser. No. 726,701, Apr. 24, 1985, abandoned.

[51] Int. Cl.$^5$ .......................... B23Q 39/02; B23C 3/12
[52] U.S. Cl. ..................... 29/561; 51/165 TP; 144/134 A; 409/137; 409/138
[58] Field of Search ............... 29/561, 33 A, 566, 560; 364/474.16, 474.01, 474.29; 409/138, 291, 300, 131, 132; 144/134 C, 134 A, 139; 51/165 TP, DIG. 14, 101 R, 129

[56] References Cited

U.S. PATENT DOCUMENTS

| | | | |
|---|---|---|---|
| Re. 30,016 | 5/1979 | Hohn | 364/474.16 |
| 2,327,407 | 8/1943 | Edyvean | 51/101 R |
| 2,597,180 | 5/1952 | Reaser et al. | 409/138 X |
| 3,292,493 | 12/1966 | Franklin | 409/138 |
| 3,922,951 | 12/1975 | Linsinger | 409/138 |
| 4,018,134 | 4/1977 | Linsinger | 409/138 |
| 4,077,287 | 3/1978 | Makeev et al. | 83/559 X |
| 4,115,956 | 9/1978 | Huffman | 51/165.71 |
| 4,162,527 | 7/1979 | Kilbane et al. | 364/474.1 |
| 4,186,529 | 2/1980 | Huffman | 51/288 |
| 4,221,514 | 9/1980 | Pavlovsky | 409/291 |
| 4,297,927 | 11/1981 | Kuroda | 83/412 X |
| 4,478,007 | 10/1984 | Bavelloni | 51/100 R |
| 4,598,380 | 7/1986 | Holmes et al. | 364/474.1 |
| 4,602,541 | 7/1986 | Benzinger et al. | 83/36 |
| 4,993,896 | 2/1991 | Dombrowski et al. | 409/138 |

FOREIGN PATENT DOCUMENTS

| | | | |
|---|---|---|---|
| 224207 | 12/1984 | Japan | 409/138 |
| 20814 | 2/1985 | Japan | 409/138 |

*Primary Examiner*—William Briggs
*Attorney, Agent, or Firm*—Finnegan, Henderson, Farabow, Garrett & Dunner

[57] ABSTRACT

The invention is directed to a device and method for profiling and deburring a workpiece. The device includes a profiler having a cutting edge for profiling a workpiece, a deburrer having a cutting edge for deburring profiled edges of a workpiece, and a yoke for supporting the profiler and the deburrer in opposed relation on opposite sides of a planar work position, the yoke being movable along a z-axis perpendicular to the work position to alternately move the cutting edges of the profiler and the deburrer toward and away from a workpiece in the work position. The yoke is also movable so that the cutting edges can be maneuvered in a working plane transverse to the z-axis. The method of the present invention includes the steps of positioning a workpiece in a working plane between a profiler and a deburrer, moving the yoke in a first direction to cause a cutting edge of the profiler to move into the working plane, moving the profiling cutting edge in a first predetermined pattern about at least a first portion of the workpiece, moving a cutting edge of the deburrer device into the working plane, and moving the deburring cutting edge about the first portion of the workpiece in a second predetermined pattern corresponding to the first predetermined pattern.

16 Claims, 7 Drawing Sheets

FIG. 7
FIRST PROFILE OPERATION

PROFILING AND DEBURRING OF WORKPIECES

RELATED APPLICATIONS

This application is a continuation-in-part of pending U.S. patent application Ser. No. 07/226,552, filed Jul. 29, 1988, now U.S. Pat. No. 4,998,206, as a continuation-in-part of U.S. patent application Ser. No. 07/107,477, filed Oct. 13, 1987, now abandoned, which was a continuation of U.S. patent application Ser. No. 06/942,261, filed Dec. 16, 1986, now U.S. Pat. No. 4,700,308, and which was a continuation of U.S. patent application Ser. No. 06/726,701, filed Apr. 24, 1985 and now abandoned.

BACKGROUND OF THE INVENTION

1. Field of the Invention

This invention is directed to a device and method for profiling individual parts and deburring the edges of profiled parts in a computerized manufacturing facility.

2. Description of Related Information

The normal practice in manufacturing air frame detail parts is to profile a stack of material to produce a number of duplicate parts and then to separate and manually deburr the edges of each part. This process is time consuming and highly labor intensive.

The present invention provides an improved device and method for profiling and deburring workpieces. The invention is particularly designed for use in conjunction with a system broadly described in U.S. Pat. No. 4,700,308 and pending U.S. patent application Ser. No. 07/226,552, filed Jul. 29, 1988, the disclosures of which are incorporated herein by reference. Other components of the automated manufacturing system are disclosed in pending U.S. patent application Ser. No. 07/358,429, filed May 30, 1989, now U.S. Pat. No. 5,081,763 U.S. patent application Ser. No. 07/251,241, filed Sep. 30, 1988, U.S. Pat. No. 4,802,357, and U.S. patent application Ser. No. 07/469,022 filed Jan. 23, 1990, now U.S. Pat. No. 5,031,441.

Advantages of the invention are set forth in part in the description which follows, and in part will be obvious in the description, or may be learned by practice of the invention.

SUMMARY OF THE INVENTION

The objects of the invention are to provide an improved device and method for profiling and deburring a workpiece that provides greater manufacturing precision.

It is also an object of the present invention to provide an automated profiling device and method that can be used in conjunction with an automated manufacturing system.

It is a further object of the present invention to provide means for profiling individual parts and to deburr their edges automatically.

Additional objects and advantages of the invention will be set forth in part in the description which follows and in part will be obvious from the description, or may be learned by practice of the invention. The objects and advantages of the invention will be realized and attained by means of the elements and combinations particularly pointed out in the appended claims.

To achieve the objects and in accordance with the purposes of the invention as embodied and broadly described herein, the invention includes a device for profiling and deburring a workpiece, the device comprising profiling means including a cutting edge for profiling a workpiece, deburring means including a cutting edge for deburring profiled edges of a workpiece, yoke means for supporting the profiling means and the deburring mean in opposed relation on opposite sides of a planar work position, the yoke means being movable along a z-axis perpendicular to the work position to alternately move the cutting edges of the profiling means and the deburring means toward and away from a workpiece in the work position, means for selectively moving the cutting edges of the profiling means and the deburring means in the plane of the work position, and means for controlling the movement of the yoke means and the moving means to profile and deburr a workpiece in the work position in accordance with a predetermined pattern. Preferably, the device includes a positioning means for orienting and holding the workpiece in the work position, the positioning means being controlled by the controlling means.

The method of the invention comprises the steps of positioning a workpiece in a working plane between a profiling device and a deburring device, the profiling device and the deburring device being movable together on a yoke, moving the yoke in a first direction to cause a cutting edge of the profiling device to move into the working plane, moving the profiling cutting edge in a first predetermined pattern about at least a first portion of the workpiece, moving the yoke in a second direction to cause a cutting edge of the deburring device to move into the working plane, and moving the deburring cutting edge about at least the first portion of the workpiece in a second predetermined pattern corresponding to the first predetermined pattern.

In a preferred embodiment, the subject method also includes rotating the workpiece by a predetermined angular amount in a first rotational direction after the first portion of the workpiece has been profiled and deburred, moving the yoke to position the cutting edge of the profiling device in the working plane, moving the profiling cutting edge in a third predetermined pattern about at least the second portion of the workpiece, moving the yoke to position the cutting edge of the deburring device in the working plane, and moving the deburring cutting edge about the second portion of the workpiece in a fourth predetermined pattern corresponding to the third predetermined pattern.

It is to be understood that both the foregoing general description and the following detailed description are exemplary and explanatory only and are not restrictive of the invention, as claimed.

The accompanying drawings, which are incorporated in and constitute a part of the specification, illustrate a preferred embodiment of the invention and together with the description, serve to explain the principals of the invention.

DESCRIPTION OF THE PREFERRED EMBODIMENT

Reference will now be made in detail to the present preferred embodiment of the invention, an example of which is illustrated in the accompanying drawings.

Figure 1:
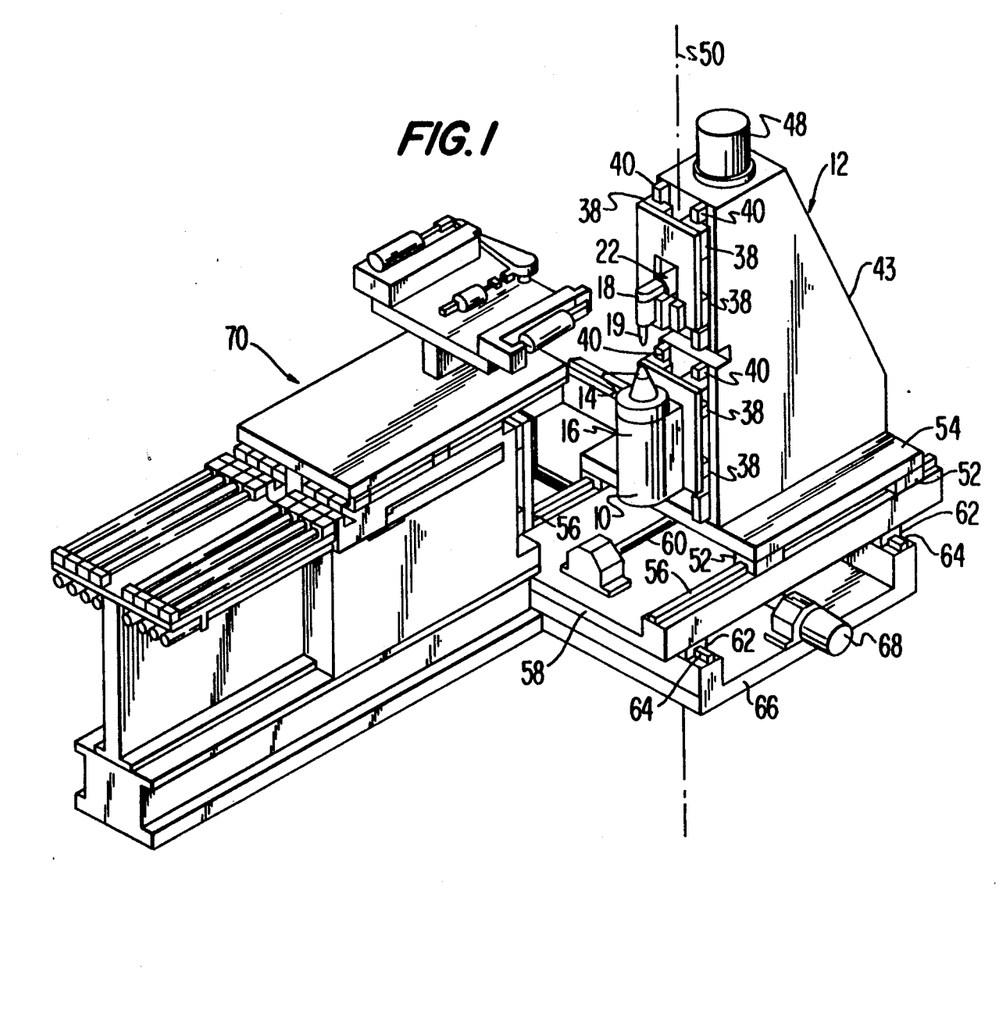
FIG. 1 is a perspective view of a profiling/deburring mechanism and a workpiece holding/rotation mechanism according to the present invention.

In accordance with the present invention, the device for profiling and deburring a workpiece comprises profiling means including a cutting edge for profiling a workpiece. As embodied herein, and as depicted in FIG. 1, profiling means includes profile mechanism 10 disposed on profile/deburr housing 12. Profile mechanism 10 includes cutting blade 14 and motor 16. Cutting blade 14 is operatively connected to motor 16 for rotation thereby.

Figure 4:
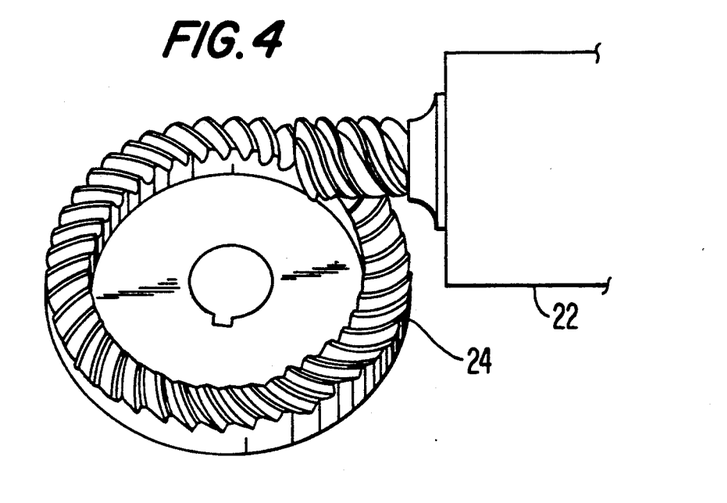
FIG. 4 is a perspective view of an anti-backlashing gear used in the deburring device of FIG. 1.

Also in accordance with the present invention, there is provided deburring means including a cutting edge for deburring profiled edges of a workpiece. As embodied herein, deburring means includes deburr mechanism 18 disposed on profile/deburr station 12. Deburr mechanism 18 includes deburring cutting blade 19 which is rotated by drive motor 22. Drive motor 22 is connected to deburring cutting blade 19 through anti-backlash gear 24, depicted in FIG. 4. Anti-backlash gear 24 prevents backlash of blade 19 during the deburring operation.

Figure 3:
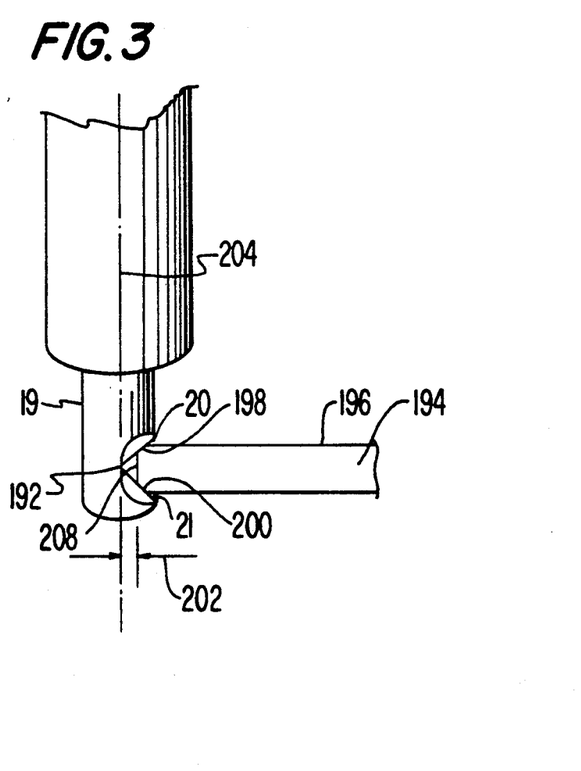
FIG. 3 is a perspective view of the deburring cutting blade shown in FIG. 1.

As shown in FIG. 3, deburring cutting blade 19 includes cutting edges 20 and 21. In order to cut equal camfers 198 and 200 on workpiece 196, intersection point 192 of cutting edges 20 and 21 is preferably aligned with the center line 194 of workpiece 196.

Figure 2:
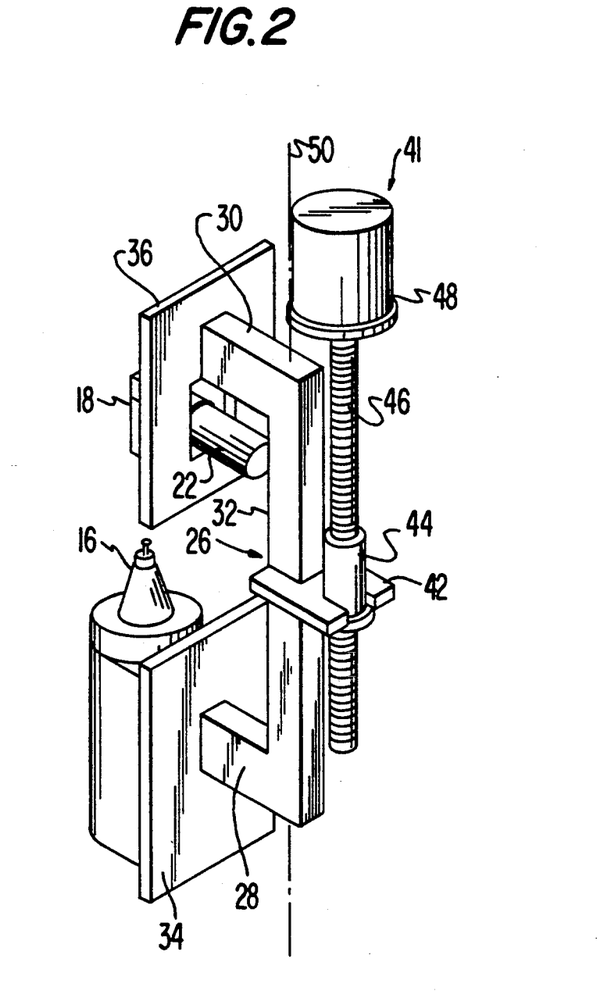
FIG. 2 is a perspective view of the yoke structure of the profiling/deburring mechanism shown in FIG. 1.

In accordance with the present invention, there is also provided yoke means for supporting the profiling means and the deburring means in opposed relation on opposite sides of a planar work position, the yoke means being movable along a z-axis perpendicular to the work position to alternately move the cutting edges of the profiling means and the deburring means toward and away from a workpiece in the work position. As embodied herein, and as depicted in FIG. 2, yoke means includes a U-shaped yoke 26 having opposing legs 28 and 30, and a mid-portion 32 connecting the opposing legs. Profile mechanism support plate 34 is mounted at a distal end of leg 28, and profile mechanism 10 is mounted on profile mechanism support plate 34. Likewise, deburr mechanism support plate 36 is mounted on a distal end of leg 30, and deburr mechanism 18 is mounted on deburr mechanism support plate 36. As shown in FIG. 1, guides 38 are mounted on support plates 34 and 36 for sliding engagement with vertical rails 40 mounted on block 43 of profile/deburr housing 12.

Yoke positioning ball screw and drive assembly 41 depicted in FIG. 2, is carried by housing 12 and includes H-shaped connector 42 extending from mid-portion 32 of U-shaped yoke 26. H-shaped connector 42 engages threaded and flanged sleeve 44. Threaded rod 46 extends through sleeve 44 and is rotatably connected to motor 48. Thus, rotation of motor 48 causes yoke 26 to move along z-axis 50 directed by guides 38 rails 40.

A workpiece (shown in FIGS. 7 and 8) may be disposed in a work position between profile cutting blade 14 and deburring blade 19. Selective rotation of motor 48 causes the cutting edges of profiling cutting blade 14 and deburring cutting blade 19 to selectively move toward and away from the workpiece.

In accordance with the invention, there is provided means for selectively moving the cutting edges of the profiling means and the deburring means in the plane of the work position. As embodied herein, and as depicted in FIG. 1, the moving means includes support plate 54 carrying housing 12, intermediate plate 58 and base 66. Guides 52 of base plate 54 slidably engage corresponding guide rails 56 on intermediate plate 58, and guides 62 on intermediate plate 58 slidably engage corresponding guide rails 64 on base 66. A first horizontal positioning ball screw and drive motor assembly 60, is mounted on intermediate plate 58 and engages support plate 54 to selectively move plate 54 on guide rails 56 relative to plate 58. Thus, selective rotation of first and second ball screw and drive motor assemblies 60, 68 causes housing 12 and, therefore, the cutting edges of profile cutting blade 14 and deburr cutting blade 19 to move along orthogonal axes perpendicular to z-axis 50. Second ball screw drive assembly 68 is disposed on base 66 and engages intermediate plate 58 to selectively move plate 58 on rails 64 relative to base 66.

Also in accordance with the invention, there is provided means for controlling the movement of the yoke means and the moving means to profile and deburr a workpiece in the work position in accordance with a predetermined pattern. As embodied herein, control means includes a programmable computer device (not shown) for controlling the movement of yoke positioning ball screw and drive assembly 41 and first and second horizontal positioning ball screw and drive assemblies 60 and 68, respectively. A work position (not shown) is defined transverse to z-axis 50 between cutting blade 14 and deburring cutting blade 19. The programmable computer device controls the movement of motor 48 to selectively cause a selected one of profile cutting blade 14 and deburring cutting blade 19 to move to the work position. The programmable computer control device also controls first and second horizontal positioning ball screw and drive motor assemblies 60 and 68 to move profile cutting blade 14 and deburring cutting blade 19 through a predetermined sequence of movements within the plane of the work position.

Figure 5:
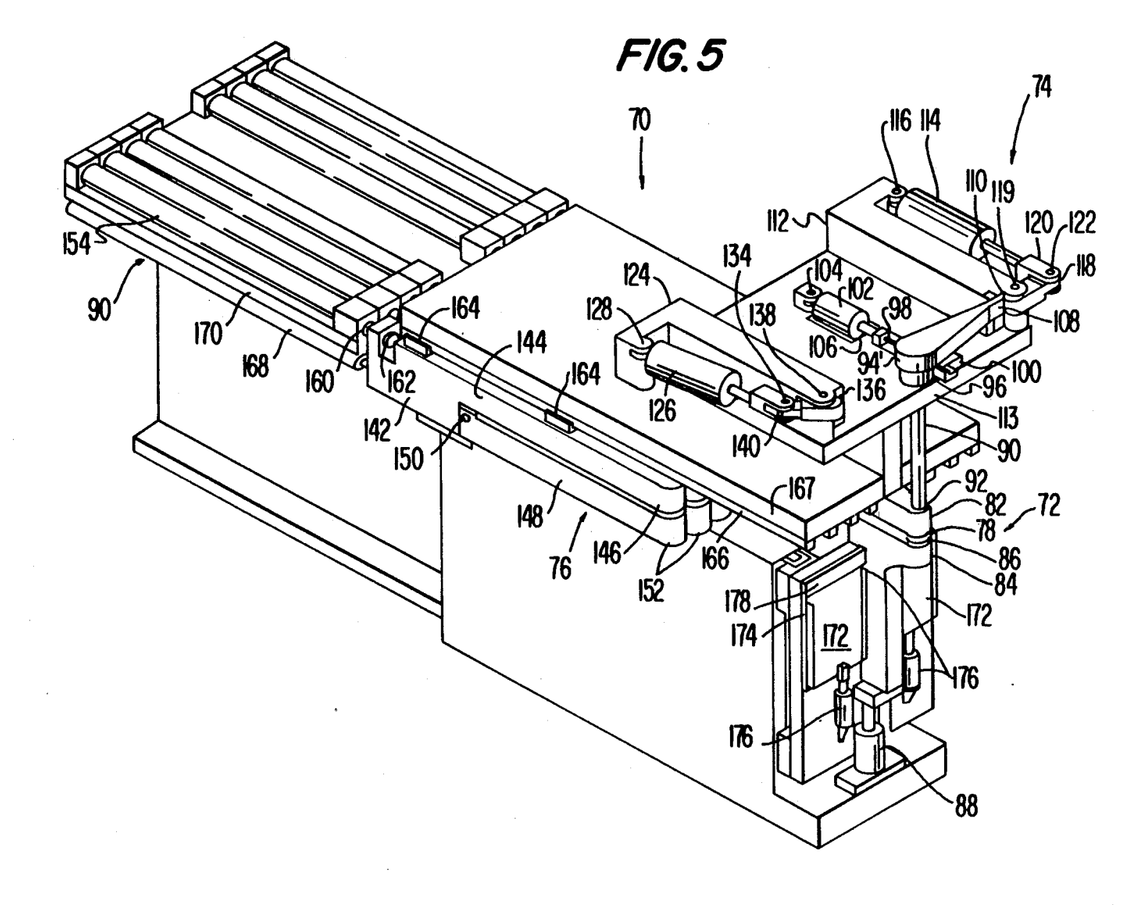
FIG. 5 is a perspective view of the holding/rotation mechanism depicted in FIG. 1.

Preferably, positioning means for orienting and holding a workpiece in the work position is provided, the controlling means controlling the positioning means. As embodied herein, and as shown in FIGS. 1 and 5, positioning means includes workpiece holding/rotation mechanism 70. Workpiece holding/rotation mechanism 70 includes material clamp mechanism 72, workpiece rotation mechanism 74, workpiece stabilizing mechanism 76 and horizontal positioning mechanism 80.

Material clamp mechanism 72 includes vertically extending lower support 84 having a freely rotatable pad 86 mounted on its top end and hydraulic cylinder 88 disposed at its bottom end. When hydraulic cylinder 88 is extended, it urges lower support 84 and freely rotating pad 86 upwards against selectively rotatable pad 78 disposed on upper support 82. In operation, this structure allows for a workpiece to be selectively clamped between freely rotating pad 86 and selectively rotatable pad 78.

Figure 6:
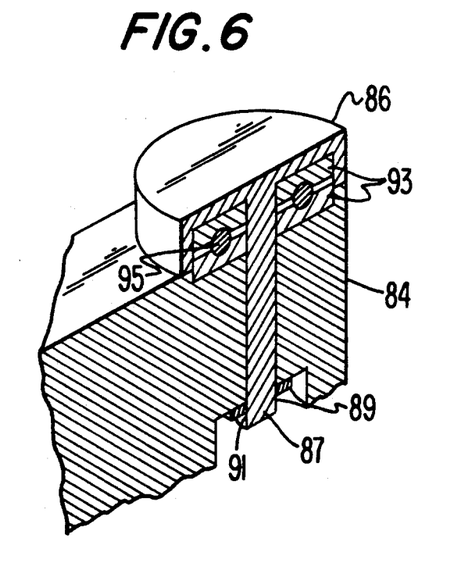
FIG. 6 is a cross-sectional perspective view of the rotatable support pad depicted in FIG. 1.

As shown in FIG. 6, freely rotatable pad 86 includes shaft 87 that extends through an opening in lower support 84. Washer 89 is maintained on a distal end of shaft 87 by locking ring 91. This structure prevents shaft 87 from being removed from lower support 84. At the core of pad 86, there is disposed bearing ring 95 between first and second bearing seats 95. This structure allows pad 86 to freely rotate on lower support 84.

Workpiece rotation mechanism 74 includes shaft 90 which extends through an opening 92 in upper support 82. Shaft 90 is connected at its bottom end to selectively rotatable pad 78, and is connected at its top end to elongated lever 94. Pinion gear 96 is fixed to the shaft directly beneath elongated lever 94 for engagement with gear rack 98. Gear rack 98 is held in engagement with pinion gear 96 by guide 100 mounted on support plate 113. Hydraulic cylinder 102 has a first end mounted on pivot 104 and has a second end including cylinder rod 106 which is connected to gear rack 98. Selective actuation of hydraulic cylinder 102 thereby causes 180° rotation of selectively rotatable pad 72 and elongated lever 94.

When lever 94 is rotated to its furthest point in a first direction, as shown in FIG. 5, tip end 108 of lever 94 is disposed in holding notch 110 of support 112. Clamp 118 is pivotable at pivot point 119 on an edge of holding notch 110 to retain lever 94 in holding notch 110.

Hydraulic cylinder 114 is provided to selectively move clamp 118 between clamping and non-clamping positions. Hydraulic cylinder 114 is pivotably connected at one of its ends to pivot point 116 on support 112. Cylinder rod and clevis 120 extends from cylinder 114, the clevis being pivotably connected to clamp 118 at pivot point 122.

A mirror-image clamping mechanism is disposed opposite the clamping mechanism just described for retaining elongated lever 94 in a second position rotated 180° from the position shown in FIG. 5. The second clamping mechanism includes clamp 140 pivotably mounted on support 124 at pivot point 138. Hydraulic cylinder 126 is pivotably mounted to support 124 at pivot point 128 and includes cylinder rod and clevis 132 pivotably mounted to clamp 140 at pivot point 134. Selective actuation of hydraulic cylinder 126 selectively clamps elongated lever 94 in holding notch 136 when tip end 108 of lever 94 is rotated into holding notch 136.

Workpiece stabilizing mechanism 76 is provided to hold a workpiece in place during profiling and deburring operations. Workpiece stabilizing mechanism 76 includes a plurality of stabilizers 142 each having an elongated upper clamp 144 with clamping ends 146. Each of upper clamps 144 includes way slides 164 mounted on an upper surface thereof for sliding engagement with corresponding ways 166 mounted beneath top plate 167. A plurality of elongated lower clamps 148 are pivotably mounted to upper clamps 144 at pivot points 150, and each lower clamp 148 has a clamping end 152 corresponding to each of the clamping ends 146 of elongated upper clamps 144.

Horizontal positioning mechanism 80 is provided to individually move each stabilizer 142 toward and away from profile/deburr station 12. Horizontal positioning mechanism 80 includes a plurality of hydraulic cylinders 154 each having a piston rod 160 attached to a corresponding stabilizer 142 by nut 162. Actuation of cylinders 154 cause piston rods 160 to extend thereby selectively moving each stabilizer along corresponding way slides 164. A plurality of linear displacement transducers 168 are disposed beneath cylinder base 170 to provide linear position feedback to the computer control device. The feedback allows for precision positioning of stabilizers 142 on the workpiece.

The workpiece stabilizing mechanism 76 also includes a pair of rectangular ways 172 disposed on either side of lower support 84. Each of ways 172 is disposed between vertically extending guide rails 174 and 176. Ways 172 have a horizontally extending pad 178 disposed along a top edge thereof, and each way 172 has a corresponding hydraulic cylinder 176 for exerting a vertical force on their lower ends. When elongated lower clamps 148 are positioned by horizontal positioning mechanism 80 so that they are above pads 178, hydraulic cylinders 176 may be actuated to exert an upward force on elongated lower clamps 148. In this manner, a workpiece is clamped between lower clamping end 152 and upper clamping end 146.

Operation of the invention will now be described. Initially, a computer controlled robot (not shown) places a workpiece 46 (shown in FIGS. 7 and 8) in between elongated upper clamps 144 and elongated lower clamps 148 of workpiece holding/rotation mechanism 170 and between pads 86, 78. A computer control system (not shown) then commands cylinder 88 to raise lower support 84 of workpiece clamp mechanism 72, thereby clamping the workpiece between pads 78 and 86. After the workpiece is firmly clamped in place, the computer commands the robot to release its grip on the workpiece and return to a home position.

The computer now requests data from linear displacement transducers 168 identifying the position of each stabilizer 142. The computer then commands the associated cylinders 154 to move stabilizers 142 forward on ways 166 until each linear displacement transducer 168 signals the computer that it is in the proper location. The computer then commands cylinders 176 to raise pads 178 into engagement with the bottom surfaces of elongated lower clamps 148, closing clamps 148 on the workpiece.

Figure 7:
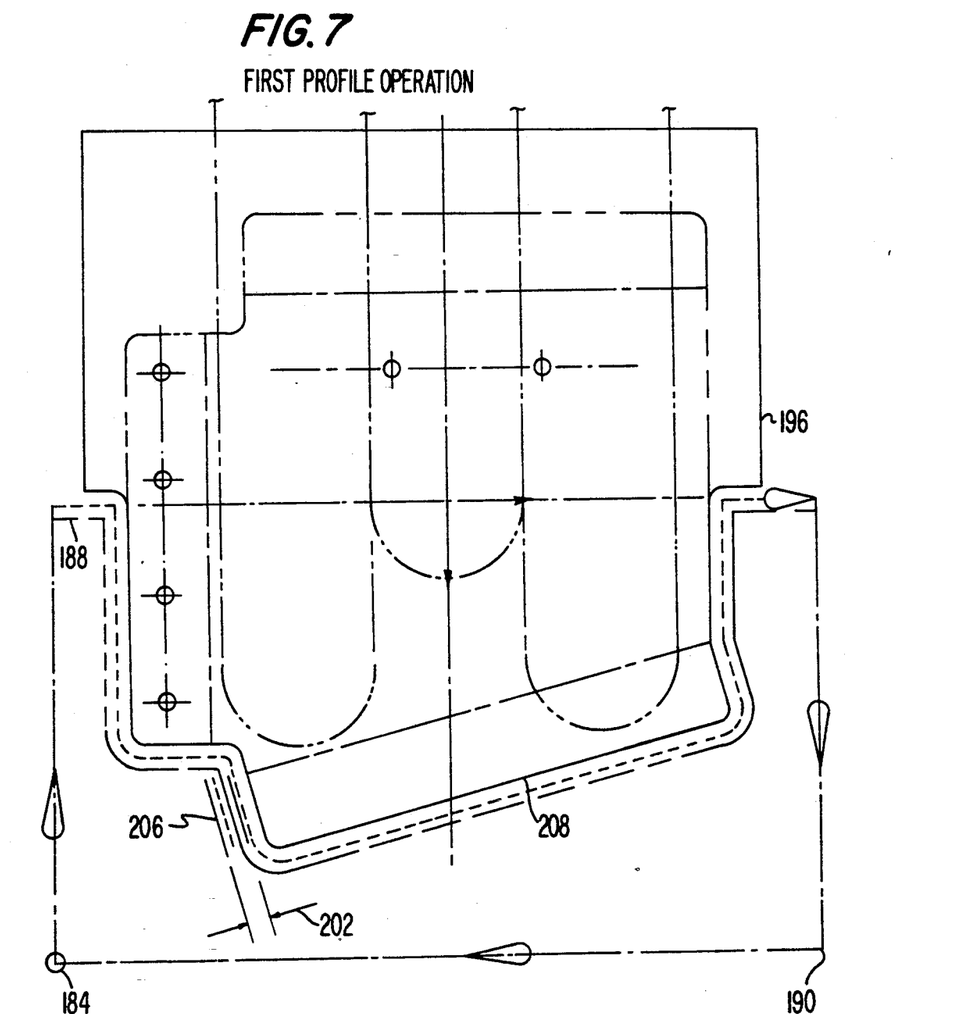
FIG. 7 is a schematic diagram depicting the first movement pattern of the profiling/deburring mechanism of FIG. 1.

Next, the computer commands motor 48 (shown in FIG. 1) to rotate thereby raising profile mechanism to place profile cutting edge in home position 184 of the work position plane as shown in FIG. 7. The computer then accesses profile data from memory which it uses to instruct first and second ball screw and drive assemblies 60 and 68 to move in a predetermined pattern 188 corresponding to the workpiece 196 being profiled.

After profiling is complete, the computer control device instructs first and second ball screw and drive assemblies 60 and 68 to return profile cutting blade 14 to home position 184 by moving the cutting blade through a return pattern 190.

Once blade 14 is in home position 184, the computer commands motor 48 to move yoke 26 so that deburring cutting blade 19 moves to the home position 184 as shown in FIG. 7. The computer calculates the exact vertical distance that deburring cutting blade 19 must travel to place the intersection point 192 of cutting edges 20 and 21 on a center line 194 of workpiece 196 as shown in FIG. 3.

Based upon the thickness of workpiece 196, the angle of cutting edges 20 and 21, and the required amount of camfers 198 and 200, the computer calculates a distance 202 that the center line 204 of deburring cutting blade 19 must be spaced from the profiled edge 208.

The computer then commands first and second ball screw and drive assemblies 60 and 68 to move the deburring cutting blade 19 along a second predetermined pattern 206 (shown in FIG. 7) corresponding to first predetermined pattern 188. Second predetermined pattern 206 is spaced from first predetermined pattern 188 by distance 202. This causes deburring cutting blade 19 to cut camfers 198 and 200 along the profiled edge of the workpiece and thereby remove all burrs from the profiled edge.

When the deburring operation is complete, first and second ball screw and drive motor assemblies 60 and 68 return deburring cutting blade 19 to home position 184 via return pattern 190. Motor 48 then rotates to exert a force on yoke 26 and thereby move deburring cutting blade 19 out of the working position.

Next, the computer commands cylinders 176 (shown in FIG. 5) to release the clamping force exerted by pad 178 on the lower surface of elongated lower clamps 148. In this manner, the workpiece is released from the hold of workpiece stabilizing mechanism 76.

Once stabilizing mechanism 76 is released, the computer commands the retraction of cylinder 114 thereby releasing the hold of clamp 118 on the tip end 108 of lever 94. The computer then commands the actuation of cylinder 102 to rotate shaft 90 in a clockwise direction. Such rotation causes a workpiece clamped between freely rotating pad 86 and selectively rotatable pad 78 to also rotate in a clockwise direction. When the workpiece has been rotated 180°, the tip end 108 of elongated lever 94 reaches holding notch 136. Cylinder 126 is then actuated by the computer to hold tip end 108 of lever 94 in holding notch 136 with clamp 140.

Figure 8:
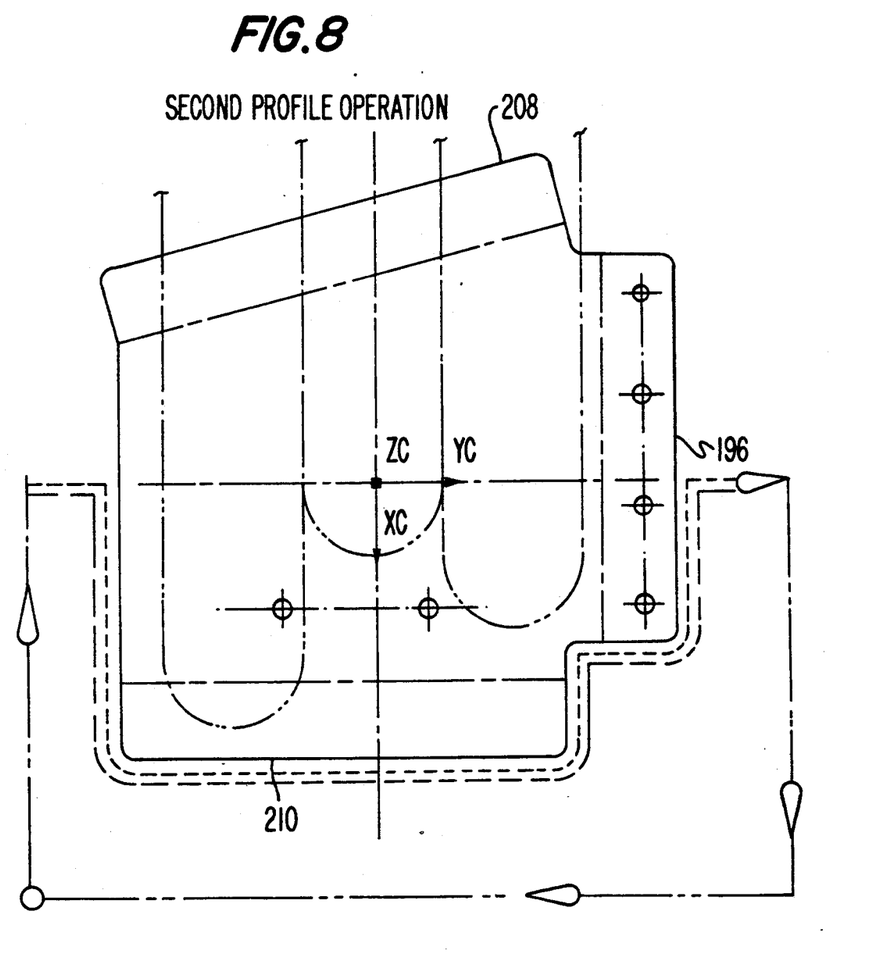
FIG. 8 is a schematic diagram depicting the second movement pattern of the profiling/deburring mechanism of FIG. 1.

The rotation operation just described serves to rotate workpiece 196 180° from the position shown in FIG. 7 to the position shown in FIG. 8. After workpiece 196 is rotated by 180°, the computer instructs pads 178 to engage stabilizing mechanism 96 and instructs profiling and deburring operations along edge 210 of workpiece 196 similar to the profiling and deburring operations described above as performed on edge 208'. When profiling and deburring of the second half of the workpiece is complete, the workpiece may be rotated back to its original position. The computer commands a robot to remove the profiled and deburred workpiece from workpiece holding/rotation mechanism 70.

It will be apparent to those skilled in the art that various modifications and variations can be made to the described embodiments of the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A device for profiling and deburring a workpiece, the device comprising:
   profiling means including a cutting edge for profiling a workpiece;
   deburring means including a cutting edge for deburring profiled edges of a workpiece;
   yoke means for supporting said profiling means and said deburring means in opposed relation on opposite sides of a planar work position, said yoke means being movable along a z-axis perpendicular to said work position to alternately move the cutting edges of said profiling means and said deburring means toward and away from a workpiece in said work position;
   means for selectively moving the cutting edges of said profiling means and said deburring means in the plane of said work position; and
   means for controlling the movement of said yoke means and said moving means to profile and deburr a workpiece in said work position in accordance with a predetermined pattern.

2. The device of claim 1 further including positioning means for orienting and holding a workpiece in the work position, and wherein said controlling means also controls said positioning means.

3. The device of claim 1 wherein said profiling means includes a first motor for rotating said profiling cutting edge, and said deburring means includes a second motor for rotating said deburring cutting edge.

4. The device of claim 3 further including an anti-backlashing gear operatively disposed between said deburring cutting edge and said second motor.

5. The device of claim 1 wherein said yoke means comprises a pair of support plates and a yoke connecting said support plates in spaced relation, each support plate supporting a respective one of said profiling means and deburring means to align said profiling and deburring cutting edges in spaced, opposed relation on said Z axis.

6. The device of claim 5 wherein said yoke means further includes a housing slidably supporting said support plates for movement together and first drive means carried by said housing and operatively engaging said yoke for selectively moving said support plates together parallel to said Z axis.

7. The device of claim 6 wherein said moving means comprises a base structure supporting said housing for independent movement along two orthogonal axes parallel to the plane of said work position and second and third drive means operatively engaging said base structure for selectively moving said housing along said two orthogonal axes.

8. The device of claim 7 wherein said controlling means is operatively connected to said first drive means to selectively dispose one of said profiling and deburring cutting edges in functional engagement with a workpiece in said work position and is operatively connected to said second and third drive means to move said housing and cutting edges through said predetermined pattern.

9. The device as in claim 2 wherein said positioning means comprises means for introducing a first predetermined portion of a workpiece into said work position, means for releasably clamping said workpiece to secure said predetermined portion in said work position for profiling and deburring, and means for rotating said workpiece in the plane of said work position to dispose a second predetermined portion of the workpiece in said work position.

10. The device of claim 9 wherein said rotating means comprises a driven pad disposed on one side of a workpiece clamped in said positioning means, a rotatable support pad in axial opposition with said driven pad and selectively moveable into engagement with the other side of the workpiece, means for axially moving said support pad to engage and displace said workpiece into frictional engagement with said driven pad, and means operable on release of said clamping means for rotating said driven pad to move said first portion of the workpiece out of said work position and to place said second portion into said work position.

11. The device of claim 9 wherein said introducing means comprises a plurality of jaw assemblies each having opposed moveable and stationary jaw elements and being disposed to receive a workpiece between the elements thereof, means for moving said jaw assemblies on an axis perpendicular to the Z axis to move a predetermined portion of a workpiece received therein into the work position, and means in communication with said controlling means for sensing the position of said jaw elements relative to said Z axis.

12. The device of claim 11 wherein said clamping means comprises means for selectively releasably biasing the moveable jaw element against the stationary jaw element of each jaw assembly to clamp a workpiece therebetween.

13. The device of claim 1 wherein said deburring cutting edge is shaped to simultaneously form opposing camfer surfaces along a profiled edge of a workpiece.

14. A device for profiling and deburring a workpiece, the device comprising:
   profiling means including a cutting edge for profiling a workpiece;
   deburring means including a cutting edge for deburring profiled edges of a workpiece;
   yoke means for supporting said profiling means and said deburring means in opposed, coaxial relation on opposite sides of a planar work position, said yoke means being movable along a z-axis perpendicular to said work position to alternately move the cutting edges of said profiling means and said deburring means toward and away from a workpiece in said work position;
   means for selectively moving the cutting edges of said profiling means and said deburring means in the plane of said work position;
   positioning means for orienting and holding a workpiece in the work position; and
   means for controlling the movement of said yoke means, said moving means, and said positioning means to profile and deburr a workpiece in the work position in accordance with a predetermined pattern.

15. A method for profiling and deburring a workpiece, comprising the steps of:
   positioning a workpiece in a working plane between a profiling device and a deburring device, the profiling device and the deburring device being movable together on a yoke;
   moving the yoke in a first direction to cause a cutting edge of the profiling device to move into the working plane;
   moving the profiling cutting edge in a first predetermined pattern about at least a first portion of the workpiece;
   moving the yoke in a second direction to cause a cutting edge of the deburring device to move into the working plane; and
   moving the deburring cutting edge about at least the first portion of the workpiece in a second predetermined pattern corresponding to said first predetermined pattern.

16. The method as set forth in claim 15 further comprising the steps of:
   rotating the workpiece by a predetermined angular amount after the first portion of the workpiece has been profiled and deburred;
   moving the yoke to position the cutting edge of the profiling device in the working plane;
   moving the profiling cutting edge in a third predetermined pattern about at least a second portion of the workpiece;
   moving the yoke to position a cutting edge of the deburring device in the working plane; and
   moving the deburring cutting edge about the second portion of the workpiece in a fourth predetermined pattern corresponding to said third predetermined pattern.

* * * * *